June 27, 1961  A. P. McGEHEE, JR  2,990,219
LUBRICATING MEANS FOR RAILROAD BEARING
Filed June 30, 1959

INVENTOR
AUBREY P. McGEHEE JR.
BY
Mitchell & Bechert
ATTORNEYS

United States Patent Office 2,990,219
Patented June 27, 1961

2,990,219
LUBRICATING MEANS FOR RAILROAD BEARING
Aubrey P. McGehee, Jr., 335 Casten St., McComb, Miss.
Filed June 30, 1959, Ser. No. 824,087
9 Claims. (Cl. 308—77)

This invention relates to lubricating means for bearings and more particularly to the lubricating means for a railroad bearing.

Such railroad bearing involves an axle journal and its brass or brasses housed in a journal box. Under normal running conditions, the heat developed by the journal in contact with the brass or brasses will not be excessive and the regular lubrication supply for the bearing will suffice. Under abnormal conditions, the heat developed by the bearing will rise above the desired allowable degree, giving rise to the hot box problem.

An object of the invention is to provide improved lubricating means for a bearing, particularly for a railroad bearing, which will serve to prevent overheating of the bearing.

More specifically, the invention proposes bearing lubricating means for supplementing the regular lubricating means, the supplemental lubricating means to come into action automatically only when needed to prevent or correct a threatening condition of excessive bearing heat and to return to stand-by status when the bearing temperature returns to normal.

The invention particularly features thermally responsive lubricating means brought into or out of play, according to temperature of the bearing to be lubricated. The thermally responsive lubricating means may include one or more lubricant applicators held in retracted positions by thermostatic means until the temperature of the bearing rises to a threatening degree, whereupon the expansion of the thermostatic means will advance the applicators to the bearing journal to apply supplemental lubricant thereto having the effect of reducing the bearing temperature. Upon reduction of the temperature, the thermostatic means will contract and hence will retreat the lubricant applicators to stand-by positions ready to serve again should the need arise.

The supplemental thermostatically controlled bearing lubricator may be in the form of a grease holder having a perforated front wall and having a rear opening to receive a separate back wall movable toward the front wall by one or more thermostatic elements upon their expansion, such movement of the back wall to be effective for extruding grease through the front wall to be taken up by the journal of the bearing. The expansion of the thermostatic elements under excessive heat may move the grease holder together with the back wall toward a normally uncovered arc of the journal and after the front wall of the holder reaches its limit of advance, the continued expansion of the thermostatic elements will move the back wall toward the front wall to force additional grease through the front wall onto the journal. If desired, the grease holder could be fixed except for the back wall which would be actuated like a piston by the thermostatic elements to force grease through the front wall upon an undue rise in temperature of the bearing or in a journal box housing the bearing. As a further alternative, the grease holder may be a rigid unit without a separately movable back wall, to be moved by the thermostatic means from a retracted to a front position relative to a journal when the temperature of the bearing rises above normal and to be retracted when the temperature drops back to normal. In the advanced position of the grease holder, the proximity of the overheated journal to the front face of the holder will cause the grease at the front face to melt and run through the perforations in the front face onto the journal. In all forms of the grease holder, it is preferred to shape the front wall concavely to have substantial concentricity with the journal. It is also understood that in the proximate position of a grease holder, the front wall will be separated from the journal periphery by a film of lubricant.

Other objects and advantages of the invention will appear from the following parts of the specification and from the drawing, wherein.

Figure 1:
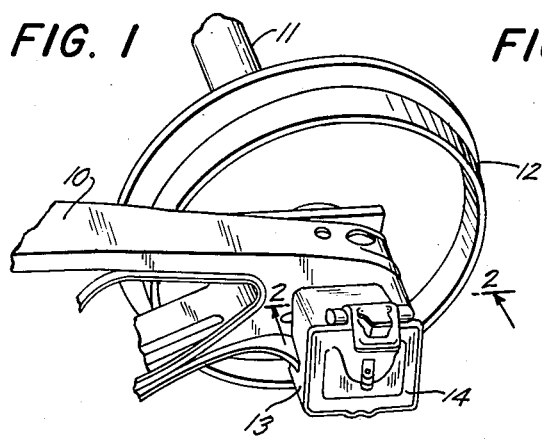
FIG. 1 is a perspective view of a part of a side frame, wheel and journal box at one end of a railway car axle.
Figure 3:
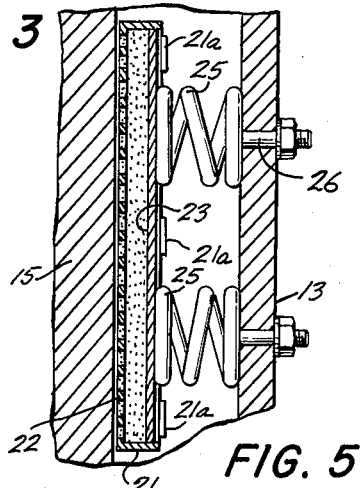
FIG. 3 is a horizontal, fragmentary section along the line 3—3 of FIG. 2.
Figure 2:
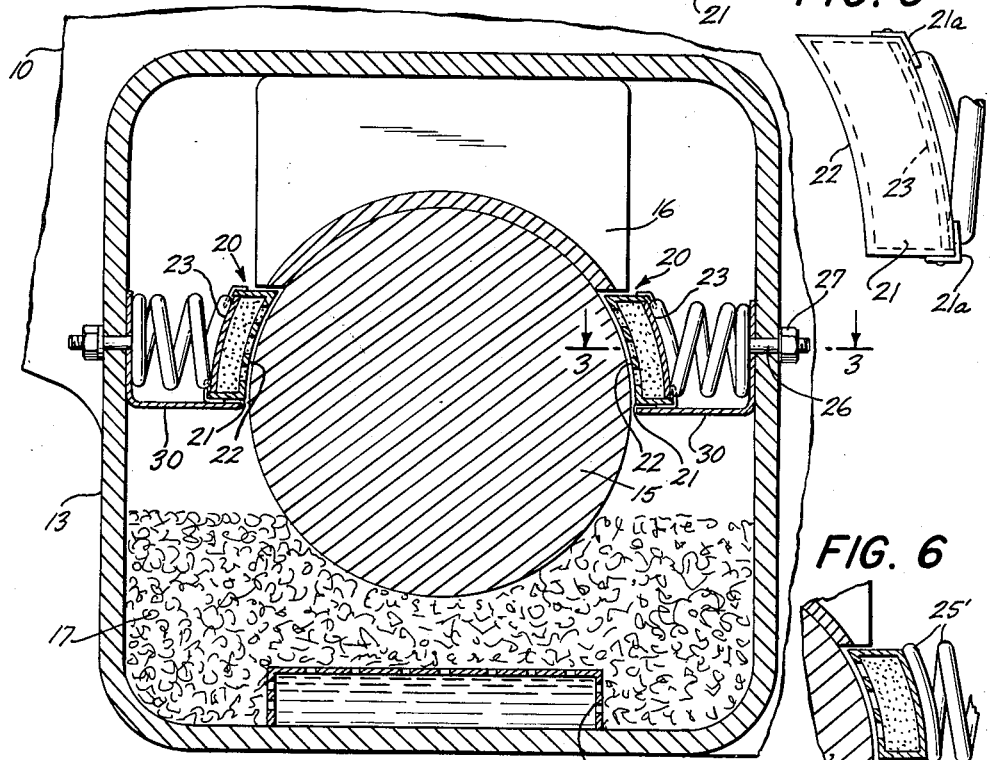
FIG. 2 is a vertical section along line 2—2 of FIG. 1.
Figure 5:
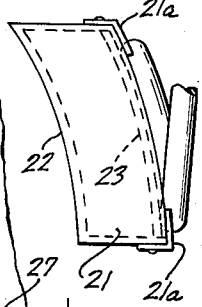
FIG. 5 is a side view on an enlarged scale of this thermostatically actuated grease holder.

In detail, FIG. 1 shows one end of a side frame 10 for mounting a car axle 11 carrying the wheel 12. The side frame 10 is provided with a journal box 13 having a lid 14. The axle journal 15 extends into the journal box and its upper arc, less than 180 degrees in the shown example, engages a bearing brass 16 mounted in the box. Constant and regular lubrication is provided for the journal by an oil-impregnated mass 17 packed into the lower portion of the journal box and covering an oil sump 18 at the bottom of the journal box. Normally, the lubrication afforded by the running of the lower arc of the journal 15 in the lubricant mass 17 is adequate to avoid overheating of the bearing. Under abnormal running conditions, the regular lubrication supplied from the mass 17 may be inadequate to prevent overheating of the bearing and the resulting development of a hot box. To prevent overheating of the bearing, the invention provides supplementary emergency lubricating means involving a supplemental lubricant supply or supplies and thermostatic means for controlling application or withdrawal of the supplemental lubricant from the bearing according to whether the temperature of the bearing or in the journal box rises above or returns to tolerable or normal temperature.

At least two supplemental lubricators are preferred, one at each side of the journal 15. Each lubricator includes a grease holder and thermostatic means for controlling flow of grease from the holder according to temperature in the journal box. Considering the form of lubricator shown in FIGS. 1 to 5, each of the two employed lubricators includes a grease applicator generally designated 20. The applicator 20 consists of a grease holding shell 21 of suitable material, such as copper or brass, closed on all sides except the rear, and having a perforated front wall 22 arcuately concavely formed or dished to conform with the contour of the confronting arc of the journal 15. The rear wall 23 of the applicator is a separate plate of copper or brass or other suitable material and is of a size to fit into the shell for substantially slidable movement toward the front wall. In practice, after the shell 21 has been filled with a high melting point grease in the class of a solid lubricant, it is slipped over the back wall 23. Any suitable construction may be provided for releasably holding the shell to the back wall. For example, as shown, angular spring metal clips 21a may be attached to the top and bottom walls of shell 21 and have their vertical legs extend partially across the open rear of the shell, flexing to permit the back plate 23 to be forced into or out of the shell. Should the shell be made of brass, or other inherently flexible material, the retaining pieces such as 21a would be formed integrally with the shell.

Each supplemental lubricator includes, in addition to the applicator 20, a pair of thermostatic elements 25 for applying the applicator. Any suitable form and material may be used for the thermostatic elements. Invar, a 36% NiFe alloy having a high coefficient of expansion is suggested as suitable material. As shown, the thermostatic elements 25 are coils of the suggested material. The two coils 25 for each applicator 20 are suitably fixed at one end to the back plate 23 of the applicator. The other end of each coil has attached to it a bolt 26 which can be slipped through a hole in the side of the journal box 13. Each pair of coils 25 and the back plate 23 carried thereby are fastened in place inside the journal box by nuts 27 threaded on the outer ends of the bolts 26. The shell 21 can be assembled to the back plate 23 before or after coils 25 and the back plate are fastened in place inside the journal box. When the supplemental lubricator assembly including shell 21, back plate 23 and two thermostatic coils 25 are in place and the temperature in the journal box is normal, then the front face 22 of the shell 21 should be at a clearance distance from the journal 15. Such clearance distance may be in the order of ¼ inch, more or less depending on the running conditions of the bearing. When the temperature in the journal box rises above normal, indicating an abnormally hot journal, the coils 25 expand and move the back plate 23 forward to press on the grease cake in shell 21 and therethrough advance the shell 21 until its front wall is virtually against the surface of the journal 15. At the same time, the back plate acts as a pusher to force grease through the perforated front wall and onto the journal surface, providing immediate additional lubrication at least sufficient to prevent further rise in temperature of the bearing. When the journal cools down from its abnormal temperature, the coils 25 contract and withdraw the supplemental lubricant applicator 21—23 to its stand-by position. The use of two supplemental lubricators respectively at opposite sides of the journal increases the protective lubrication supplied to the journal when its temperature rises to a threatening degree. It is understood that the face 22 of the grease holder or shell 21 will, even in its advanced position, be separated from the journal surface by a film of lubricant. The upper wall of each grease holding shell 21 is located slightly under the bottom of the brass 16 and above a ledge 30 fastened with the journal box 13, so that vertical play of the grease holder is limited by the brass and the ledge.

It is possible, if desired, to provide a limit other than the bearing surface for the advance of the grease holding shell and to depend mainly upon movement of the back plate to push the lubricating grease through the perforated front wall and onto the journal surface.

Figure 6:
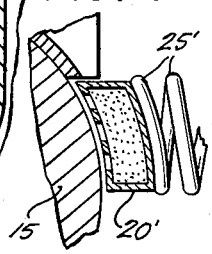
FIG. 6 is a fragmentary section showing an alternative form of grease holder which may be used.
Figure 4:
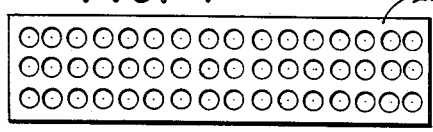
FIG. 4 is a front view of the thermostatically actuated grease holder shown in FIGS. 2 and 3.

Instead of the grease applicator and holder having a separate back plate slidable inside the body of the holder, it may be a hollow rigid unit with an integral back plate. Such modification is shown in FIG. 6, where the grease holder is designated 20' and has a back wall rigid with the other walls of the holder. The thermostatic coils 25' are attached to the back wall of the integral grease holder and when the temperature in the journal box rises above normal advance the grease holder to bring its front face against the surface of the journal 15. The heat generated by the journal will melt the grease at the front face of the holder 20', and the grease will flow through the perforations in the front wall to supply the journal with supplemental lubrication.

While the invention has been disclosed in connection with the embodiments shown, it is understood that changes may be made within the scope of the invention as defined in the following claims.

I claim:

1. Supplemental lubricating means for a railroad bearing or the like, comprising a lubricant holder unit and thermostatic means sensitive to heat of the bearing to move said unit into lubricating position for producing a flow of lubricant from the holder to the bearing upon an increase in temperature of the bearing and for effectively interrupting the flow of lubricant from the holder upon the return of the bearing to a suitable temperature.

2. Supplemental lubricating means for the journal of a railroad bearing or the like, comprising a lubricant applicator confronting a surface of the journal and thermostatic means responsive to heat of the bearing for moving the applicator into lubricant applying position for applying lubricant to the journal upon a rise in the bearing temperature above a suitable norm and for retracting the applicator upon return of the bearing temperature toward the norm.

3. Supplemental lubricating means for the journal of a railroad bearing or the like housed in a journal box, comprising a lubricant applicator and thermostatic means attached at one end to the journal box and connected at the opposite end to the lubricant applicator to advance the applicator into effective lubricant applying relation with the journal upon expansion due to abnormal bearing heat and to retract the applicator to ineffective lubricant applying relation with the journal upon return of the bearing heat to a suitable normal heat.

4. The invention according to claim 3, the applicator comprising a grease holder carried by the thermostatic means and having a perforated front wall concavely curved to conform to the curvature of a confronting arc of the journal.

5. The invention according to claim 4, the grease holder including a separate back plate attached to the thermostatic means and effective as a pusher plate, upon the expansion of the thermostatic means, for forcing grease through the perforated front wall of the holder.

6. The invention according to claim 5, the thermostatic means including a coil of Invar or other suitable material having a bolt end for attachment to a wall of the journal box and an opposite end attached to the back plate of the grease holder.

7. The invention according to claim 3, the lubricant applicator comprising a rigid grease container with a perforated front wall curved to conform to the curvature of a confronting arc of the journal, the advance of the applicator by the thermostatic means bringing the front wall into vertical concentric contact with the confronting arc of the journal, the contraction of the thermostatic means upon return of the bearing heat to normal retracting the front wall of the grease container from the confronting arc of the journal.

8. In apparatus of the kind indicated, an axle journal and a journal box enclosing the journal, in combination with emergency lubricating means for the journal comprising lubricant holders in stand-by spaced confrontation to opposite surfaces of the journal and thermostatic elements mounted to the journal box and connected to the emergency lubricating means and effective upon expansion due to a temperature increase in the box to actuate the lubricant holders for applying lubricant to the journal, the thermostatic elements upon contraction due to return of the temperature to a suitable norm retracting the lubricant holders to the stand-by spaced confrontation with the journal.

9. A bearing and lubricator assembly including a journal, a journal box therefor, and a constantly acting lubricant supply means for the journal in combination with emergency lubricating means comprising a pair of lubricant applicators normally in ineffective lubricant applying relation to the journal and thermostatic means mounted to the journal box and connected to the applicators to serve upon expansion, resulting from a rise in bearing heat above a suitable norm, for operating the applicators to apply additional lubricant to the journal and serving upon contraction resulting from return of the temperature to the norm for returning the applicators to an inactive status.

References Cited in the file of this patent

UNITED STATES PATENTS

| | | |
|---|---|---|
| 1,922,306 | Krause et al. | Aug. 15, 1933 |
| 2,024,536 | Pearce | Dec. 17, 1935 |